US012800129B2

(12) United States Patent
Jiang et al.

(10) Patent No.: US 12,800,129 B2
(45) Date of Patent: Nov. 17, 2026

(54) STAGE LIGHT FIXTURE WITH TRANSLATIONAL AND ROTATABLE EFFECT WHEEL

(71) Applicant: Guangzhou Haoyang Electronic Co., Ltd., Guangzhou (CN)

(72) Inventors: Weikai Jiang, Guangzhou (CN); Xing Tian, Guangzhou (CN); Zhiqiang Chen, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 0 days.

(21) Appl. No.: 19/286,785

(22) Filed: Jul. 31, 2025

(65) Prior Publication Data

US 2026/0185683 A1 Jul. 2, 2026

(30) Foreign Application Priority Data

Dec. 31, 2024 (CN) ........................ 202423322815.X

(51) Int. Cl.
*F21V 14/08* (2006.01)
*F21V 11/08* (2006.01)
*F21W 131/406* (2006.01)

(52) U.S. Cl.
CPC .............. *F21V 14/08* (2013.01); *F21V 11/08* (2013.01); *F21W 2131/406* (2013.01)

(58) Field of Classification Search
CPC .......................... F21V 14/08; F21W 2131/406
USPC .......................................................... 362/277
See application file for complete search history.

(56) References Cited

U.S. PATENT DOCUMENTS 7,278,759 B2 * 10/2007 Ziemkowski .......... G03B 15/05 362/205
2003/0076681 A1 * 4/2003 Rasmussen ........... F21S 10/007 362/322
2021/0108784 A1 4/2021 Jiang

FOREIGN PATENT DOCUMENTS

| | | | |
|---|---|---|---|
| CN | 109764300 | A | 5/2019 |
| CN | 218846030 | U | 4/2023 |
| EP | 3 862 622 | A1 | 8/2021 |
| WO | WO-2021/073553 | A1 | 4/2021 |

* cited by examiner

*Primary Examiner* — Toan C Ly
(74) *Attorney, Agent, or Firm* — MUNCY, GEISSLER, OLDS & LOWE, P.C.

(57) ABSTRACT

A stage light fixture with a translational rotatable effect wheel, having a light head in which a light source is arranged for emitting a light beam and an effect wheel is supported on a mounting plate. The effect wheel is driven to translate by a first driving mechanism so as to selectively switch into/out of a light path formed by the light beam, and driven to rotate by a synchronous belt of a second driving mechanism. The second driving mechanism is substantially fixed in position relative to the first driving mechanism, and at least a segment of the synchronous belt of the second driving mechanism for driving rotation of the effect wheel is in a direction parallel to a translation direction of the effect wheel.

17 Claims, 5 Drawing Sheets

STAGE LIGHT FIXTURE WITH TRANSLATIONAL AND ROTATABLE EFFECT WHEEL

CROSS REFERENCE TO RELATED APPLICATIONS

The present application claims priority from Chinese Application No. CN 202423322815.X filed on Dec. 31, 2024, all of which are hereby incorporated herein by reference.

TECHNICAL FIELD

The present disclosure relates to the technical field of stage light fixtures, and more specifically, to a stage light fixture with a translational and rotatable effect wheel.

BACKGROUND

Various effect wheels are usually provided within the stage light fixtures, which intercepts light beams to generate rich and abundant light effects. Some effect wheels are especially required to selectively switch into and out of the light path, and even rotate in the light path. However, switching into or out of the light path in a swinging way will occupy a large space, especially for the effect wheels having a large area. In addition, a driving mechanism for rotating the effect wheels are generally configured to move along with the effect wheel, which will arise the problems of wiring difficulty, weight balance, and spatial clearance, resulting in a more complex driving mechanism.

SUMMARY

Therefore, the present disclosure provides a stage light fixture with a translational and rotatable effect wheel, in which the effect wheel can be driven to translate and rotate, and a driving mechanism driving the effect wheel to rotate is fixed relative to a driving mechanism driving the effect wheel to translate.

The stage light fixture of the present disclosure has a light head in which a light source is arranged for emitting a light beam and an effect wheel is supported on a mounting plate, where the effect wheel is driven to translate by a first driving mechanism so as to selectively switch into/out of a light path formed by the light beam, and driven to rotate by a synchronous belt of a second driving mechanism, and where the second driving mechanism is substantially fixed in position relative to the first driving mechanism, and at least a segment of the synchronous belt of the second driving mechanism for driving rotation of the effect wheel is substantially in a direction parallel to a translation direction of the effect wheel.

In the stage light fixture of the present disclosure, the occupied space for the movement range of the effect wheel can be reduced by changing the movement mode of the effect wheel into translation from swinging. In addition, the second driving mechanism driving rotation of the effect wheel is fixedly arranged relative to the first driving mechanism driving translation of the effect wheel, namely the second driving mechanism does not move together with the effect wheel, which avoids the need for the light head to make corresponding spatial clearance in response to the movement of the second driving mechanism, thus further saving space as well as reducing the difficulty of connecting a power/signal cable to the second driving mechanism. Furthermore, at least the segment of the synchronous belt of the second driving mechanism for driving rotation of the effect wheel is substantially in the direction parallel to the translation direction of the mounting plate, so that the distance between the effect wheel and such segment of the synchronous belt of the second driving mechanism is unchanged during the translation of the effect wheel. This allows different positions along the segment of the synchronous belt of the second driving mechanism to successively drive the effect wheel to rotate during the translation of the effect wheel, thereby increasing stability of the driving system.

In particular, the effect wheel is used to generate dynamic effects. For the purpose of this, the effect wheel is provided with light-transmitting holes radially distributed from a rotation center thereof. When the effect wheel with such configuration is switched into the light beam, the light beam can only pass through the light-transmitting holes to form corresponding patterns in the projected light spot and thus create a dynamic light effect, especially dynamic effects similar to flames.

In the present disclosure, during translation the effect wheel has a first translating position and a second translating position that intercept the light beam, and an included angle between radial directions extending from the rotation center of the effect wheel toward a center of the light beam when the effect wheel is respectively at the first and second translating positions ranges from 80 degrees to 100 degrees. In such configuration, the two patterns projected from the light-transmitting holes at the two translating positions are substantially perpendicular to each other. For example, when the effect wheel is at the first translating position, the image of the light-transmitting holes in the light spot appears in a transverse extension, and when the effect wheel is at the second translating position, the image of the light-transmitting holes in the light spot appears in a longitudinal extension.

In a preferred embodiment of the present disclosure, in order to further save space, a driven wheel may be pivotally connected to the mounting plate and meshed with the effect wheel, and the effect wheel may be rotatable together with the driven wheel driven by the synchronous belt of the second driving mechanism. In such way, the space occupied by the synchronous belt of the second driving mechanism can be effectively reduced using the driven wheel, as the synchronous belt of the second driving mechanism does not need to loop around the entire effect wheel for driving.

In a more preferred embodiment of the present disclosure, to facilitate installation of the synchronous belt of the second driving mechanism, a conversion wheel may be coaxially connected to the driven wheel, and the synchronous belt of the second driving mechanism is engaged with the conversion wheel. Via the conversion wheel the height of the synchronous belt of the of the second driving mechanism can be adjusted relative to the effect wheel.

Furthermore, two steering wheels may be further pivotally connected to the mounting plate on one side of the conversion wheel, and the synchronous belt of the second driving mechanism is sequentially arranged around one of the steering wheels, the conversion wheel and the other steering wheel. The two steering wheels can allow the synchronous belt of the second driving mechanism to press closely against the conversion wheel, thereby enabling the synchronous belt of the second driving mechanism to stably drive the conversion wheel.

According to a preferred embodiment, the first driving mechanism may include a slide rail for guiding translation of the effect wheel and a slider connected to the mounting plate, where the slider may be driven to slide along the slide rail through a synchronous belt of the first driving mechanism. The slider is preferably fixed to the synchronous belt of the first driving mechanism and is slidably arranged on the slide rail. In this way, the effect wheel mounted on the mounting plate which is connected to the slider can be synchronously driven to move together with the synchronous belt of the first driving mechanism.

Guide members may be further provided for guiding the synchronous belt of the first driving mechanism to prevent the synchronous belt from shaking or twisting, so as to assure stable driving for the slider.

In a preferred embodiment of the present disclosure, the first driving mechanism may further include a first driving gear connected to a driving shaft of the first driving mechanism and a first driven gear, the synchronous belt of the first driving mechanism may be arranged around the first driving gear and the first driven gear, and the slider may be located between the first driving gear and the first driven gear. In such configuration, the synchronous belt of the first driving mechanism can be tensioned by the first driving gear and the first driven gear to stably drive the slider to move.

Furthermore, the second driving mechanism may include two rotation wheels respectively rotatably connected to the driving shaft of the first driving mechanism and a mounting shaft of the first driven gear, and a second driving gear connected to a driving shaft of the second driving mechanism, and the synchronous belt of the second driving mechanism may be arranged around the two rotation wheels and driven to rotate though the second driving gear. In this way, the mounting shafts of the first driving gear and the first driven gear are used to mount the synchronous belt of the second driving mechanism, which thus can further save space.

More preferably, the second driving mechanism may further include a tensioning wheel, and the synchronous belt of the second driving mechanism may be sequentially arranged around the first driving gear, the second driving gear, and the tensioning wheel, and then engaged with the effect wheel to drive it to rotate. The tensioning wheel can tension the synchronous belt of the second driving mechanism, and also allow adjustment of the position of the second driving gear as needed, thereby providing more flexibility in position selection of the second driving mechanism.

The light fixture of the present disclosure may further include a support arm supporting rotation of the light head and a base supporting rotation of the support arm. With such configuration, the light emitted from the light source can be directed in any direction.

Reference signs: 100 light head; 110 light source; 120 mounting plate; 121 frame plate; 130 effect wheel; 131 light-transmitting hole; 132 driven wheel; 133 conversion wheel; 134 steering wheel; 135 mounting seat; 140 first driving mechanism; 141 first synchronous belt; 142 slide rail; 143 slider; 144 first driving gear; 145 first driven gear; 146 guide member; 150 second driving mechanism; 151 second synchronous belt; 152 rotation wheel; 153 second driving gear; 154 tensioning wheel; 200 supporting arm; and 300 base.

DETAILED DESCRIPTION OF THE EMBODIMENTS

The accompanying drawings are only used for illustrative description and cannot be understood as limitation on the disclosure. To better explain this embodiment, some parts in the accompanying drawings may be omitted, enlarged, or zoomed out, which does not represent an actual product size. For those skilled in the art, it is understandable that some well-known structures and explanations thereof in the accompanying drawings may be omitted. Positional relationships described in the accompanying drawings are only used for illustrative description and should not be understood as limitation on the disclosure.

Figure 1:
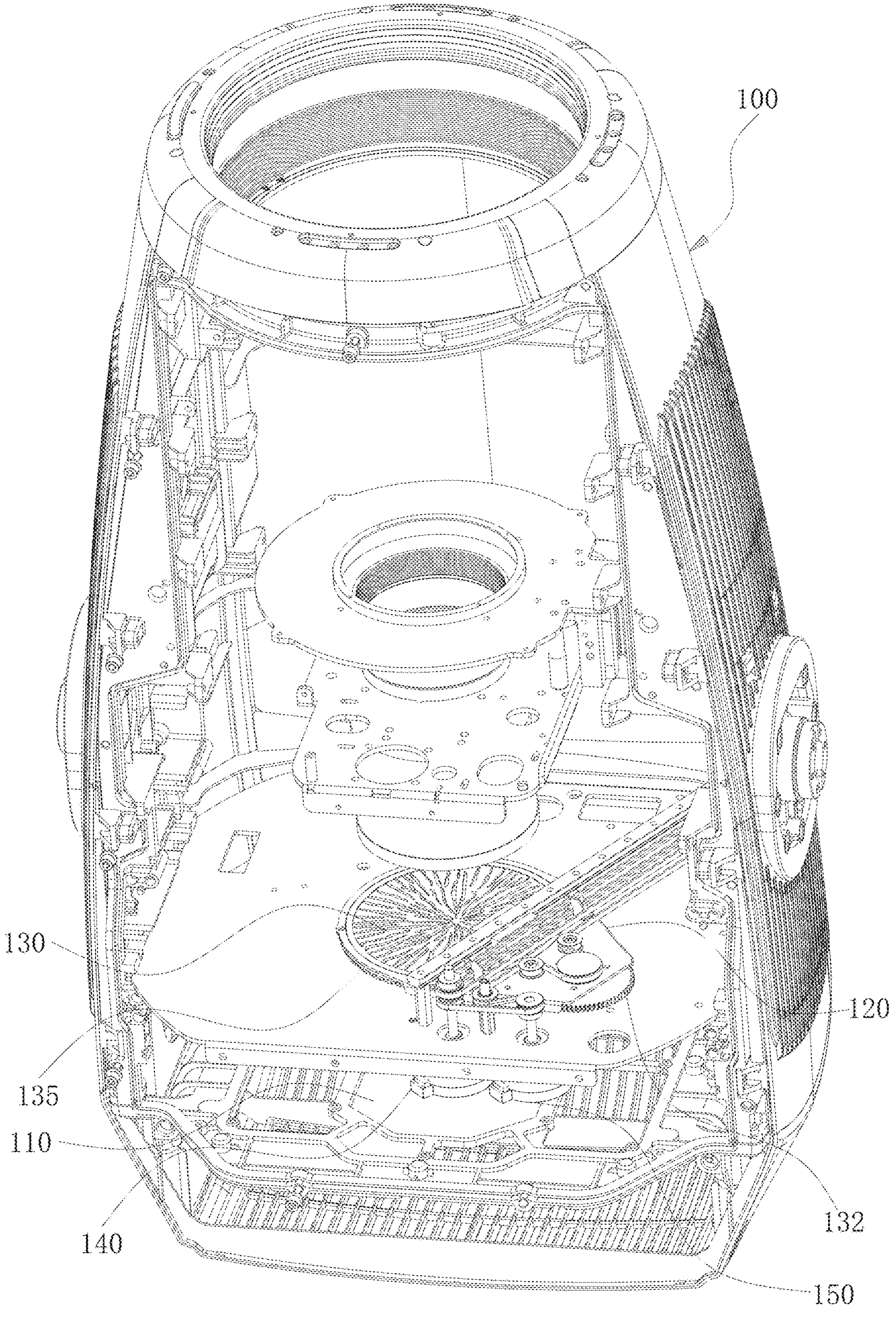
FIG. 1 is a schematic structure diagram of a light head of a light fixture according to an embodiment of the present disclosure, with a housing removed.

FIG. 1 provides a stage light fixture with a translational and rotatable effect wheel according to an embodiment of the present disclosure. The stage light fixture has a light head 100, in which a light source 110 is located for emitting a light beam. A translatable mounting plate 120 is provided in the light head 100, and the effect wheel 130 is pivotally connected to the mounting plate 120. A first driving mechanism 140 configured to drive the mounting plate 120 to translate and a second driving mechanism 150 configured to drive the effect wheel 130 to rotate through a second synchronous belt 151 are further provided. Under the driving of the first driving mechanism 140, the effect wheel 130 connected to the mounting plate 120 can be selectively switched into/out of a light path formed by the light beam. In this embodiment, the second driving mechanism 150 is fixed in position relative to the first driving mechanism 140, and at least a segment of the second synchronous belt 151 for driving rotation of the effect wheel 130 has a direction substantially parallel to a translation direction of the mounting plate 120.

According to the stage light fixture in the present embodiment, the occupied space for a movement range of the effect wheel is greatly reduced by changing a movement mode of the effect wheel 130 into translating from swinging. In addition, the second driving mechanism 150 driving the rotation of the effect wheel 130 is fixedly arranged relative to the first driving mechanism 140 driving the translation of the effect wheel 130, namely the second driving mechanism 150 does not translate together with the effect wheel 130, which avoids the need for the light head 100 to make corresponding spatial clearance in response to the movement of the second driving mechanism 150, thus saving the occupied space, as well as reducing the difficulty of connecting a power/signal cable to the second driving mechanism 150. Furthermore, the segment of the second synchronous belt 151 for driving rotation of the effect wheel 130 is in the direction parallel to the translation direction of the mounting plate 120, so that the distance between the effect wheel 130 and such segment of the second synchronous belt 151 is unchanged during the translation of the effect wheel 130. This allows different positions along the segment of the second synchronous belt 151 to successively drive the effect wheel 130 to rotate during the translation of the effect wheel 130, thereby increasing stability of the driving system.

The effect wheel 130 may be a gobo wheel with a rotation center located within the light beam when intercepting the light beam, a prism wheel, or a multi-colour wheel which can render the light beam into at least two colours at a given moment when intercepting the light beam.

The effect wheel 130 is preferably an effect wheel used to generate dynamic effects, which is formed with light-transmitting holes 131 radially distributed from the rotation center thereof. When the effect wheel 130 is translated into the light beam, the light beam is intercepted by the effect wheel 130 and only allow the light beam to pass through the light-transmitting holes 131, thereby forming corresponding patterns in the projected light spot and thus creating a dynamic light effect.

In this embodiment, the effect wheel can achieve dynamic effects similar to flames.

Figure 2:
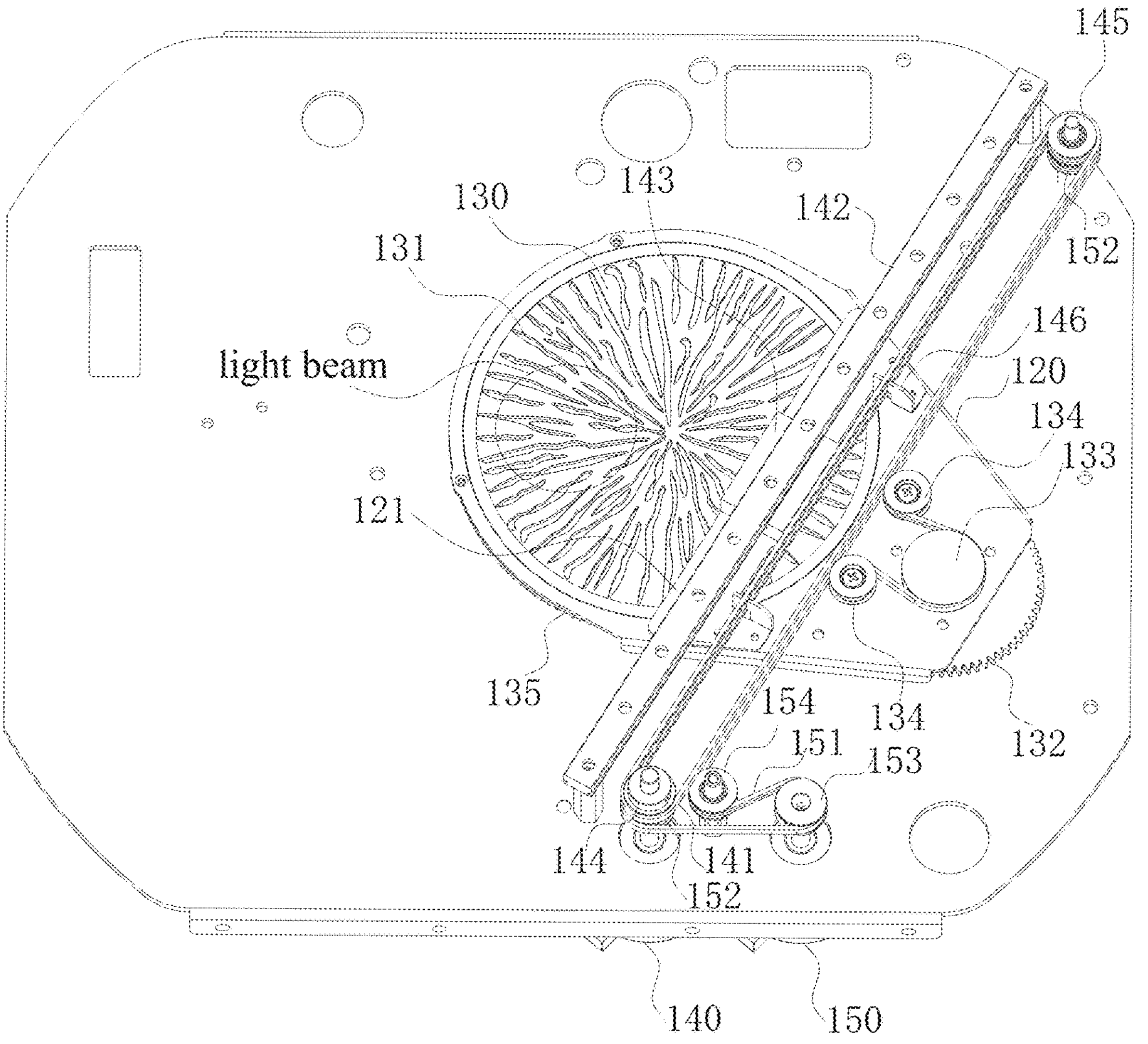
FIG. 2 is a schematic structural diagram of an effect wheel of the light fixture at a first translating position.
Figure 3:
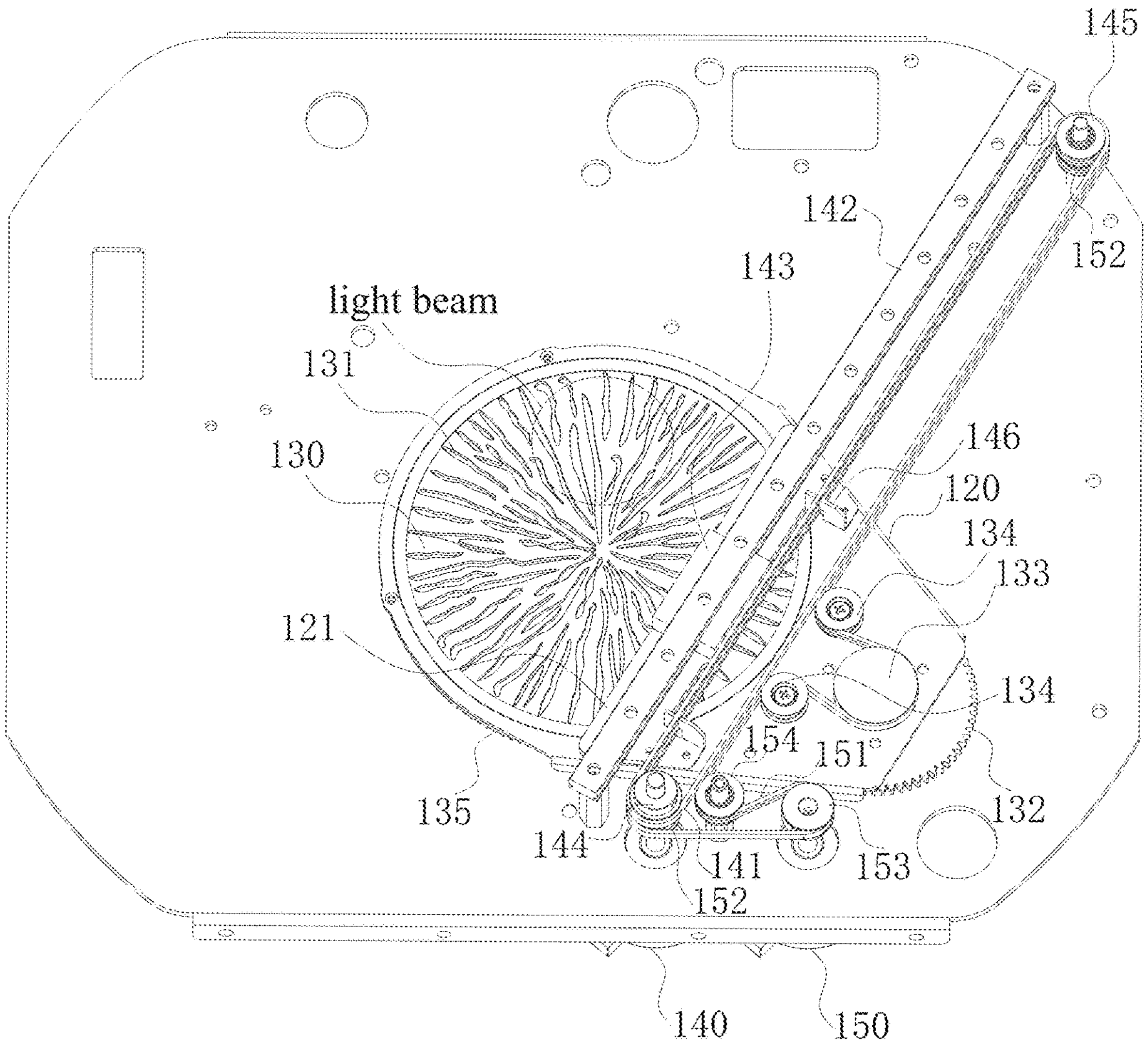
FIG. 3 is a schematic structural diagram of the effect wheel at a second translating position.

During translation driven by the first driving mechanism 140, the effect wheel 130 has a first translating position (as shown in FIG. 2) and a second translating position (as shown in FIG. 3) for intercepting the light beam, and an included angle between radial directions extending from the rotation center of the effect wheel 130 toward a center of the light beam when the effect wheel 130 is respectively at the first translating position and at the second translating position ranges from 80 degrees to 100 degrees, preferably 90 degrees. Accordingly, the two patterns projected from the light-transmitting holes 131 at the two translating positions are substantially perpendicular to each other. For example, when the effect wheel 130 is at the first translating position, the image of the light-transmitting holes 131 in the light spot appears in a transverse extension, and when the effect wheel 130 is at the second translating position, the image of the light-transmitting holes 131 in the light spot appears in a longitudinal extension.

In this embodiment, the rotation center of the effect wheel, when at the first translating position or the second translating position, lies outside the light beam.

It is conceivable that the effect wheel 130 may be translated to any position between the first translating position and the second translating position, which allows the image of the light-transmitting holes 131 to appear in an oblique extension.

Referring to FIG. 2 and FIG. 3, a driven wheel 132 is pivotally connected to the mounting plate 120, which is meshed with the effect wheel 130 and driven by the second synchronous belt 151. The second synchronous belt 151 thus drives the effect wheel 130 to rotate via the driven wheel 132. Such configuration can effectively reduce the space occupied by the second synchronous belt 151 by using the driven wheel 132, as the synchronous belt 151 is not required to loop around the entire effect wheel 130 for driving.

Figure 4:
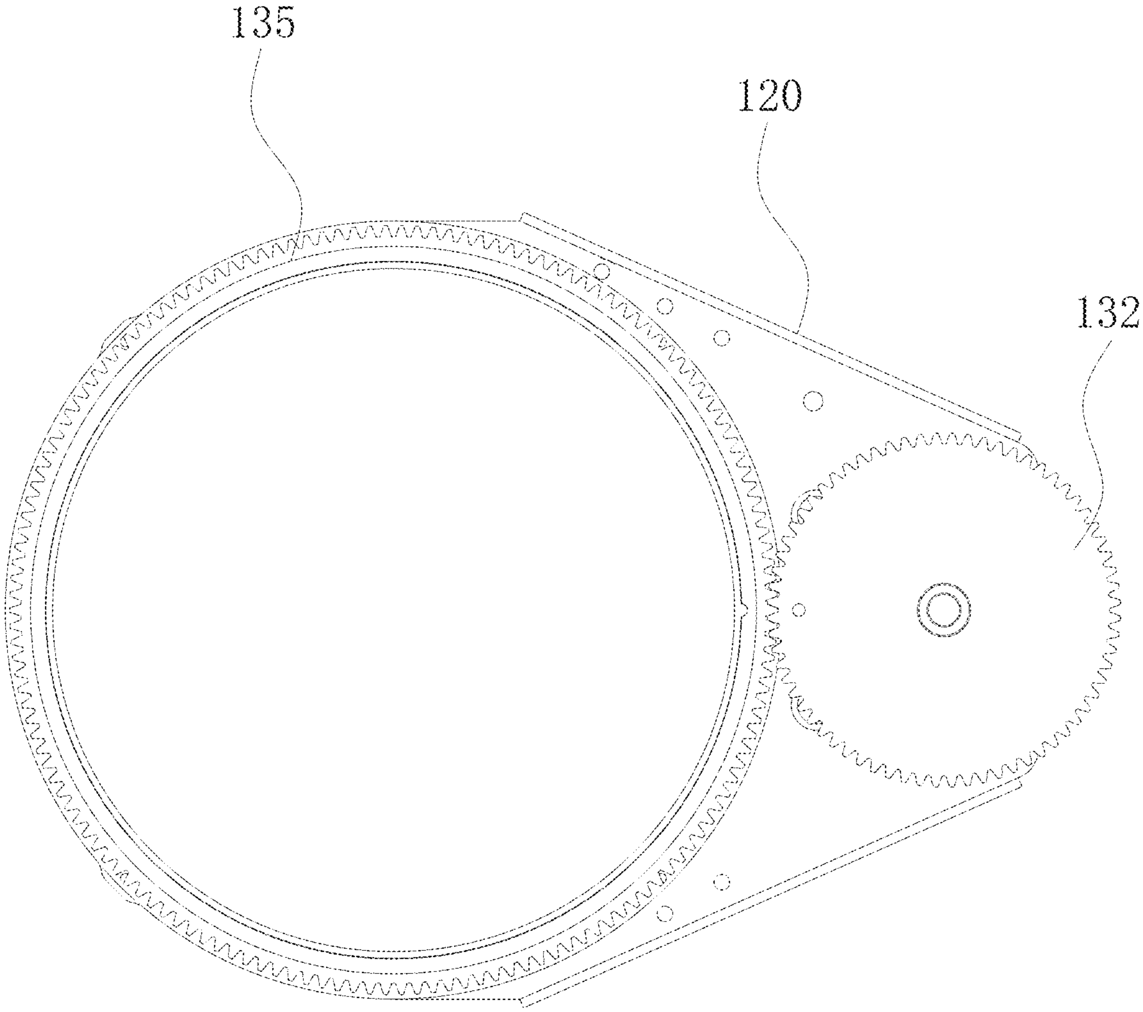
FIG. 4 is a schematic structural diagram showing how to rotate the effect wheel according to an embodiment of the present disclosure.
Figure 5:
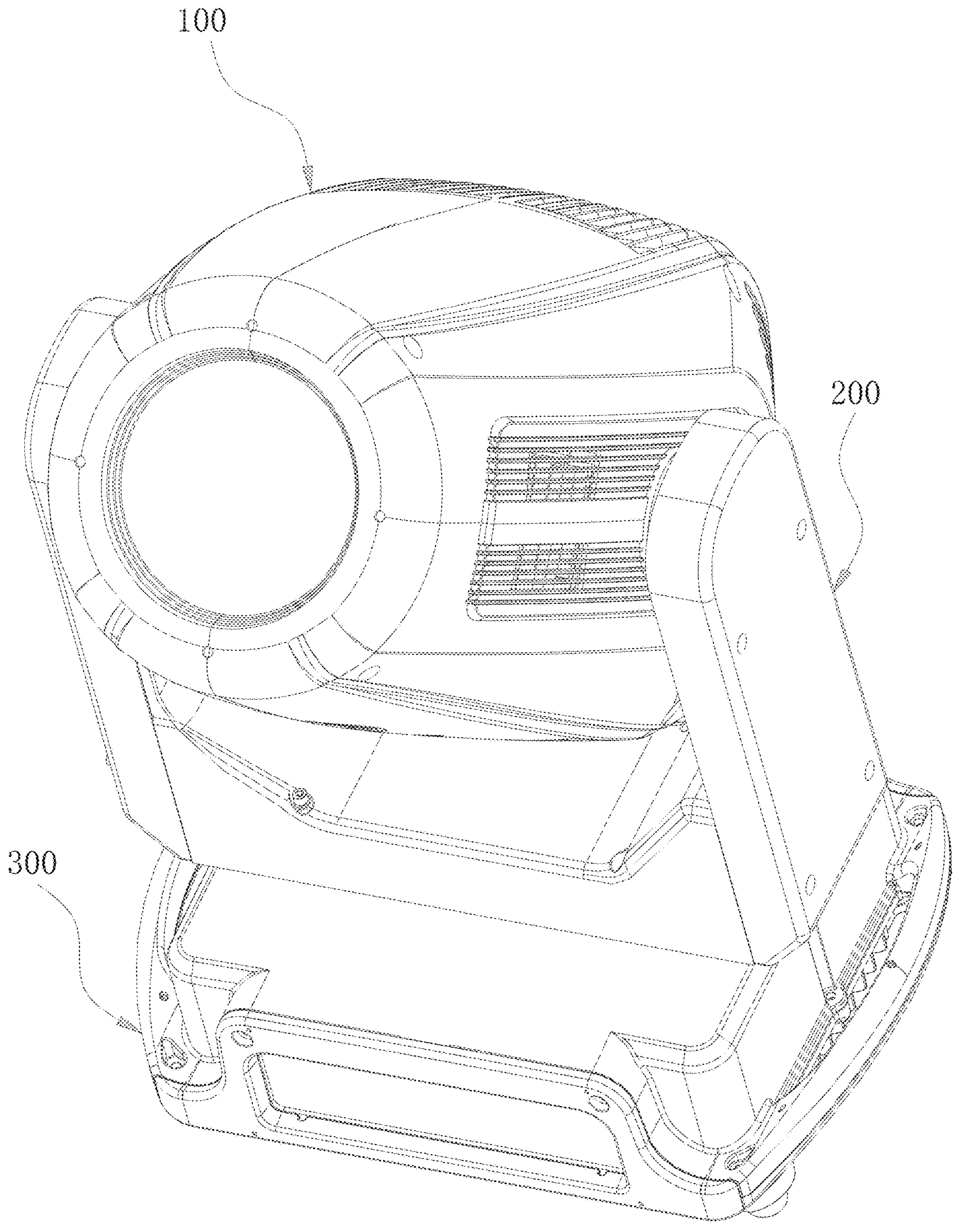
FIG. 5 is a perspective view of a stage light fixture according to an embodiment of the present disclosure.

As shown in FIG. 4, in this embodiment, a mounting seat 135 is provided on the mounting plate 120 for mounting the effect wheel 130. The effect wheel 130 is fixedly arranged relative to the mounting seat 135, and the driven wheel 132 is meshed with the mounting seat 135.

As shown in FIG. 2 and FIG. 3, a conversion wheel 133 is coaxially connected to the driven wheel 132 and meshed with the second synchronous belt 151. With the configuration of the conversion wheel 133, the height of the second synchronous belt 151 relative to the effect wheel 130 can be adjusted, thereby facilitating installation of the second synchronous belt 151.

In this embodiment, the conversion wheel 133 and the driven wheel 132 are respectively located on two opposite sides of the mounting plate 120, and the conversion wheel 133 has a smaller size than the driven wheel 132.

Two steering wheels 134 are further pivotally connected to the mounting plate 120 on one side of the conversion wheel 133, especially the side close to the effect wheel 130. The second synchronous belt 151 is sequentially arranged around one of the steering wheels 134, the conversion wheel 133, and the other steering wheel 134. The two steering wheels 134 allow the second synchronous belt 151 to press closely against the conversion wheel 133, thereby enabling the second synchronous belt 151 to stably drive the conversion wheel 133.

In such case, the segment of the second synchronous belt 151 for driving the rotation of the effect wheel 130 is defined by a part of the second synchronous belt 151 from the steering wheels 134, that is the extension direction of the part of the second synchronous belt 151 passing through the two steering wheels 134 is in a direction parallel to the translation direction of the mounting plate 120.

In this embodiment, a slide rail 142 is further provided for guiding the translation of the mounting plate 120, a slider 143 is connected to the mounting plate 120 and is driven to slide along the slide rail 142 through a first synchronous belt 141 under driving of the motor of the first driving mechanism 140. Particularly, the slider 143 is fixed to the first synchronous belt 141 and is slidably arranged on the slide rail 142. In this way, the first synchronous belt 141 drives the mounting plate 120 connected to the slider 143 to move synchronously.

Guide members 146 for guiding the first synchronous belt 141 are further provided on the mounting plate 120 to prevent the first synchronous belt 141 from shaking or twisting, so as to assure stable driving for the slider 143.

Two guide members 146 are preferably provided. Each of the two guide members 146 is provided with a slot for guiding the first synchronous belt 141, with the width slightly greater than the thickness of the first synchronous belt 141, but allowing the first synchronous belt 141 smoothly to pass through.

In this embodiment, the slider 143 is fixed to a frame plate 121 which spans over the effect wheel 130 on the mounting plate 120.

A first driving gear 144 fixed to a driving shaft of the first driving mechanism 140 and a first driven gear 145 are further provided. The first synchronous belt 141 is arranged around the first driving gear 144 and the first driven gear 145, and the slider 143 is located therebetween. The first driving gear 144 and the first driven gear 145 tension the first synchronous belt 141 to stably drive the slider 143 to move.

The driving shaft of the first driving mechanism 140 is rotatably provided with a rotation wheel 152. The mounting shaft of the first driven gear 145 is also rotatably provided with a rotation wheel 152. The second synchronous belt 151 is further arranged around the two rotation wheels 152. A second driving gear 153 is fixed to a driving shaft of a motor of the second driving mechanism. The second synchronous belt 151 is driven to rotate by the motor of the second driving mechanism 150 through the second driving gear 153. Using the mounting shafts of the first driving gear 144 and the first driven gear 145 for the first second synchronous belt 141 to arrange the second synchronous belt 151 can further save space.

In this embodiment, the segment of the second synchronous belt 151 for driving rotation of the effect wheel 130 is coplanar with the first synchronous belt 141 in a direction parallel to the propagating direction of the light beam.

A tensioning wheel 154 is further provided in the present embodiment, which is especially located between the first driving gear 144 and the second driving gear 153. In such case, the second synchronous belt 151 is sequentially arranged around the first driving gear 144, the second driving gear 153, and the tensioning wheel 154, and then engaged with the effect wheel 130. The tensioning wheel 154 can tension the second synchronous belt 151, and allow adjustment of the position of the second driving gear 153 as needed, thereby providing more flexibility in position selection of the second driving mechanism 150.

In this embodiment, the segment of the second synchronous belt 151 for driving rotation of the effect wheel 130 is defined by a part of the second synchronous belt 151 from the tensioning wheel 154 sequentially arranged around one of the steering wheels 134, the conversion wheel 133, the other steering wheel 134, and the rotation wheel 152 coaxial with the first driven gear 145.

In this embodiment, the steering wheels 134 and the tensioning wheel 154 are in toothless engagement with the second synchronous belt 151 and abut against one side, without engagement teeth, of the second synchronous belt 151.

The whole second synchronous belt 151 is substantially in a direction parallel to a translation direction of the mounting plate 120.

As shown in FIG. 4, the stage light fixture further includes a support arm 200 supporting the rotation of the light head 100 and a base 300 supporting the rotation of the support arm 200. With the rotation of the light head 100 and the support arm 200, the light emitted from the light source 110 can be directed in any direction.

Apparently, the above-mentioned embodiments of the present disclosure are merely examples provided to clearly illustrate the present disclosure, and are not intended to limit the implementations of the present disclosure. Those of ordinary skill in the art may also make other different forms of changes or variations based on the above-mentioned descriptions. It is neither necessary nor possible to exhaustively list all implementations here. Any modifications, equivalent substitutions, improvements, etc., made within the spirit and principle of the present disclosure shall fall within the scope of protection of the claims of the present disclosure.

What is claimed is:

1. A stage light fixture with a translational and rotatable effect wheel, having a light head in which a light source is arranged for emitting a light beam and the effect wheel is supported on a mounting plate, wherein the effect wheel is driven to translate by a first driving mechanism so as to selectively switch into/out of a light path formed by the light beam, and driven to rotate through a synchronous belt of a second driving mechanism, and wherein the second driving mechanism is substantially fixed in position relative to the first driving mechanism, and at least a segment of the synchronous belt of the second driving mechanism for driving rotation of the effect wheel is substantially in a direction parallel to a translation direction of the effect wheel;

wherein the first driving mechanism comprises a slide rail for guiding translation of the effect wheel and a slider connected to the mounting plate, and the slider is driven to slide along the slide rail through a synchronous belt of the first driving mechanism;

wherein the first driving mechanism further comprises a first driving gear connected to a driving shaft of the first driving mechanism and a first driven gear, the synchronous belt of the first driving mechanism is arranged around the first driving gear and the first driven gear, and the slider is located between the first driving gear and the first driven gear; and wherein the second driving mechanism comprises two rotation wheels respectively rotatably connected to the driving shaft of the first driving mechanism and a mounting shaft of the first driven gear, and a second driving gear connected to a driving shaft of the second driving mechanism, and the synchronous belt of the second driving mechanism is arranged around the two rotation wheels and is driven to rotate through the second driving gear.

2. The stage light fixture according to claim 1, wherein the effect wheel is configured to generate dynamic effects, which is provided with light-transmitting holes radially distributed from a rotation center thereof.

3. The stage light fixture according to claim 2, wherein during translation the effect wheel has a first translating position and a second translating position that intercept the light beam, and an included angle between radial directions extending from the rotation center of the effect wheel toward a center of the light beam when the effect wheel is respectively at the first and second translating positions ranges from 80 degrees to 100 degrees.

4. The stage light fixture according to claim 1, wherein a driven wheel is pivotally connected to the mounting plate and meshed with the effect wheel, and the effect wheel is rotatable together with the driven wheel driven by the synchronous belt of the second driving mechanism.

5. The stage light fixture according to claim 4, wherein a conversion wheel is coaxially connected to the driven wheel, and the synchronous belt of the second driving mechanism is engaged with the conversion wheel.

6. The stage light fixture according to claim 5, wherein two steering wheels are further pivotally connected to the mounting plate on one side of the conversion wheel, and the synchronous belt of the second driving mechanism is sequentially arranged around one of the steering wheels, the conversion wheel and the other steering wheel.

7. The stage light fixture according to claim 1, wherein the guide members are further provided for guiding the synchronous belt of the first driving mechanism.

8. The stage light fixture according to claim 1, wherein the second driving mechanism further comprises a tensioning wheel, and the synchronous belt of the second driving mechanism is sequentially arranged around the first driving gear, the second driving gear, and the tensioning wheel, and is then engaged with the effect wheel to drive it to rotate.

9. The stage light fixture according to claim 1, further comprising a support arm supporting rotation of the light head and a base supporting rotation of the support arm.

10. A stage light fixture with a translational and rotatable effect wheel, having a light head in which a light source is arranged for emitting a light beam and the effect wheel is supported on a mounting plate, wherein the effect wheel is driven to translate by a first driving mechanism so as to selectively switch into/out of a light path formed by the light beam, and driven to rotate through a synchronous belt of a second driving mechanism, and wherein the second driving mechanism is substantially fixed in position relative to the first driving mechanism, and at least a segment of the synchronous belt of the second driving mechanism for driving rotation of the effect wheel is substantially in a direction parallel to a translation direction of the effect wheel;

wherein a driven wheel is pivotally connected to the mounting plate and meshed with the effect wheel, and the effect wheel is rotatable together with the driven wheel driven by the synchronous belt of the second driving mechanism.

11. The stage light fixture according to claim 10, wherein a conversion wheel is coaxially connected to the driven wheel, and the synchronous belt of the second driving mechanism is engaged with the conversion wheel.

12. The stage light fixture according to claim 11, wherein two steering wheels are further pivotally connected to the mounting plate on one side of the conversion wheel, and the synchronous belt of the second driving mechanism is sequentially arranged around one of the steering wheels, the conversion wheel and the other steering wheel.

13. The stage light fixture according to claim 10, wherein the first driving mechanism comprises a slide rail for guiding translation of the effect wheel and a slider connected to the mounting plate, and the slider is driven to slide along the slide rail through a synchronous belt of the first driving mechanism.

14. The stage light fixture according to claim 13, wherein the guide members are further provided for guiding the synchronous belt of the first driving mechanism.

15. The stage light fixture according to claim 13, wherein the first driving mechanism further comprises a first driving gear connected to a driving shaft of the first driving mechanism and a first driven gear, the synchronous belt of the first driving mechanism is arranged around the first driving gear and the first driven gear, and the slider is located between the first driving gear and the first driven gear.

16. The stage light fixture according to claim 15, wherein the second driving mechanism comprises two rotation wheels respectively rotatably connected to the driving shaft of the first driving mechanism and a mounting shaft of the first driven gear, and a second driving gear connected to a driving shaft of the second driving mechanism, and the synchronous belt of the second driving mechanism is arranged around the two rotation wheels and is driven to rotate through the second driving gear.

17. The stage light fixture according to claim 16, wherein the second driving mechanism further comprises a tensioning wheel, and the synchronous belt of the second driving mechanism is sequentially arranged around the first driving gear, the second driving gear, and the tensioning wheel, and is then engaged with the effect wheel to drive it to rotate.

* * * * *